United States Patent [19]

Zeller et al.

[11] Patent Number: 4,962,591

[45] Date of Patent: Oct. 16, 1990

[54] CALIBRATION-TEST MEMBER FOR A COORDINATE-MEASURING INSTRUMENT

[75] Inventors: Rudolf Zeller, Winzingen; Joachim Neumann, Oberkochen, both of Fed. Rep. of Germany

[73] Assignee: Carl-Zeiss-Stiftung, Heidenheim/Brenz, Oberkochen, Fed. Rep. of Germany

[21] Appl. No.: 413,374

[22] Filed: Sep. 27, 1989

[30] Foreign Application Priority Data

Oct. 3, 1988 [DE] Fed. Rep. of Germany ....... 3833578

[51] Int. Cl.$^5$ ............................................. G01C 25/00
[52] U.S. Cl. .................................... 33/502; 33/567; 73/1 J
[58] Field of Search ............... 33/502, 503, 567; 73/1 R, 1 E, 1 J

[56] References Cited

U.S. PATENT DOCUMENTS

| | | | |
|---|---|---|---|
| 2,831,256 | 4/1958 | Werle | 33/567 |
| 3,417,475 | 12/1968 | Vlasaty | 33/567 |
| 3,775,858 | 12/1973 | Meyer | 33/567 |
| 4,155,243 | 5/1979 | Elsner | 73/1 R |
| 4,364,182 | 12/1982 | Jones | 33/567 |
| 4,373,267 | 2/1983 | Lycan | 33/502 |
| 4,492,036 | 1/1985 | Beckwith, Jr. | 33/503 |
| 4,523,450 | 6/1985 | Herzog | 33/502 |
| 4,763,507 | 8/1988 | Zofchak | 73/1 J |

OTHER PUBLICATIONS

Neumann H. J., "Genauigkeitsanganaben zu Drehtischen und Besonderheiten ihrer Anwendung auf Koordinaten-Mess geraten"VD1-Berichte 529, VD1-Verlag GmbH, Dusseldorf 1984.

"Technisches Messen", vol. 51, 1984, Issue No. 3, pp. 83-95 Federal Physical-Technical Institute (Physikalisch-Technischen Bundesantalt) or the National Bureau of Standards.

*Primary Examiner*—Thomas B. Will
*Attorney, Agent, or Firm*—Hopgood, Calimafde, Kalil, Blaustein & Judlowe

[57] ABSTRACT

A calibration-test member in the form of a ball plate fixedly mounts a plurality of precision balls arrayed in spaced relation in a single plane. The ball plate is of symmetrical construction with respect to this plane, the balls being so mounted within one or more cutouts of the plate or on the edge of the plate, with ball centers in the plane of symmetry of the plate, that contacting of the balls is possible from both sides.

7 Claims, 3 Drawing Sheets

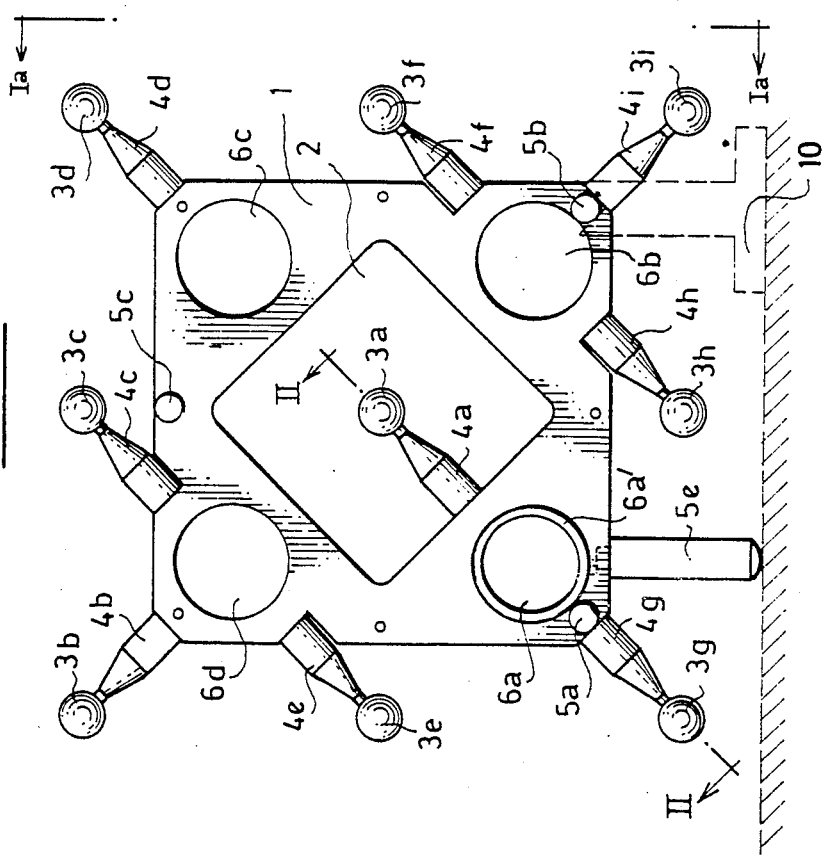
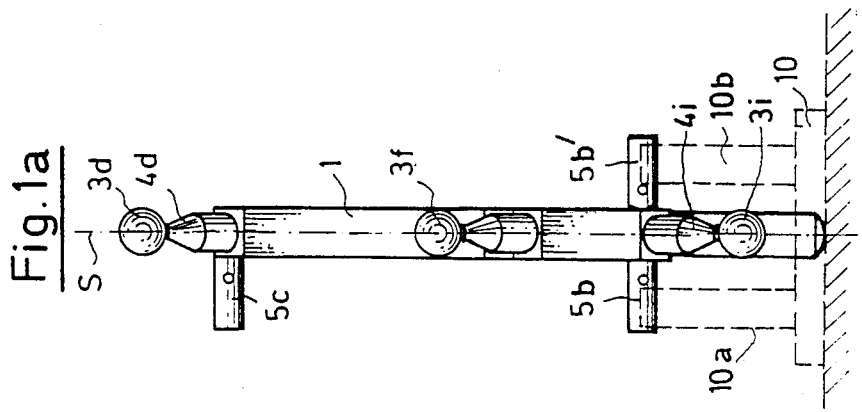

CALIBRATION-TEST MEMBER FOR A COORDINATE-MEASURING INSTRUMENT

BACKGROUND OF THE INVENTION

The present invention relates to a test standard for a coordinate-measuring instrument, in the form of a ball plate which contains a plurality of balls lying in the same plane.

In the testing of a coordinate-measuring instrument, current practice generally uses gauge blocks of graduated standardized lengths, which are set up in different orientations, for example, parallel or diagonal to the measurement axes of the coordinate-measuring instrument and within the measurement volume thereof. These tests are very time-consuming; they must not only be performed at the factory as part of final inspection of the completed coordinate-measuring instrument, but these tests must also be performed at regular intervals at the user's location. Furthermore, testing by means of standardized gauge blocks can only yield single-dimensional predictions as to the errors of the measuring instrument. Since the entire course of such testing requires a very long period of time, there is the further danger that temperature variation can impair the precision of measurement.

It has already been proposed to test coordinate-measuring instruments by means of ball plates. Thus, for example, U.S. Pat. No. 4,364,182 describes a ball plate having a three-dimensional distribution of balls. Such test bodies, however, do not have sufficient inherent stability, so that the distances between the balls can change relatively easily. Frequent recalibration of the test piece itself is therefore necessary.

The journal "Technisches Messen", Volume 51, 1984, Issue No. 3, at pages 83-95, describes various calibration-test bodies, including bodies in the form of a flat perforated plate and in the form of a flat ball plate. In the latter case, the balls are so positioned by means of cylindrical stilts on the surface of the flat support body that all balls lie in the same plane. Such a calibrated test device is then set up in several positions, for example, in a skewed orientation, within the measurement volume of the coordinate-measuring instrument to be tested.

This known test device has only limited longtime stability. It is also relatively heavy and has the disadvantage that the balls which it mounts can only be contacted from one side.

The aforementioned test bodies, such as gauge blocks, ball plates and perforated plates, must furthermore be calibrated. This is possible only at calibration stations equipped for this purpose, such as, for example, the Federal Physical-Technical Institute (Physikalisch-Technischen Bundesanstalt), or the National Bureau of Standards. Recalibration at regular time intervals therefore means a relatively great expenditure of time and money.

BRIEF STATEMENT OF THE INVENTION

The object of the present invention is to provide a test standard which provides a stable reference for the longest possible time and can be easily handled, and which is suitable without limitation for requisite tests for measurement accuracy, i.e., testing for uncertainty of longitudinal measurement, for contacting uncertainty and for the orthogonal relation of the measurement axes of the coordinate-measuring instrument.

The invention achieves this object in a calibration-test standard of ball-plate configuration, wherein spaced plural balls are fixedly mounted in a two-dimensional array, with all ball centers located in a single central plane of symmetry, and wherein the balls are mounted with clearance for multiple-access probe contact at one or more openings in the plate and along the edge of the plate.

The test standard has very high intrinsic stability since the balls are arrayed in the plane of symmetry of the plate, i.e., in their neutral axes, and as a result of the symmetrical construction. Any deformation of the plate, for example, due to its own weight as a function of set-up orientation, furthermore only very slightly and negligibly affects distances of ball centers from each other.

Due to the long-term stability of such a ball plate, recalibration is necessary only at relatively long intervals. This recalibration can, however, be performed simply and rapidly in a procedure which will be described.

To this end, it is merely necessary that the test member be measured, in accordance with the reversal method, in each of two positions, preferably 90° apart, on a coordinate measuring instrument and that the length of one standardized gauge block be determined, at some point in time and on the same measuring instrument. This method is described by H. Kunzmann and F. Waldele in the article: "Two-Dimensional Test Bodies for Determination of the Measurement Properties of Coordinate Measuring Instruments", Transactions of the International Convention on "Modern Manufacture and Manufacturing Measurement Technique", Apr. 2-4, 1986, Polytechnical University of Vienna.

This method has the advantage that, due to its self-calibrating properties, calibration and/or testing for accuracy can be performed on a coordinate-measuring instrument, even though the measurement uncertainty of the measuring instrument is unknown but is to be determined with the test standard. The method of calibration can therefore be performed by the operator of the coordinate-measuring instrument, on the spot, and without requiring the presence or assistance of the manufacturer's service personnel.

If the mounting of the balls is such as to permit contacting engagement with the test standard from both sides, the test standard enables a determination of errors in angle of roll of the vertical spindle of the coordinate-measuring instrument.

It is advisable for each of several of the balls to be fixed to the projecting end of a rugged supporting stem, projecting outward from the edge of the plate. The plate itself can then be kept small and is of minimal weight, so that it can be easily handled.

Furthermore, it is advisable to provide the plate with a protective cover, as of sheet aluminum. The cover protects the balls from such impact, during a testing procedure, as would otherwise make a recalibration necessary.

It is also advantageous to insert a gauge ring in the plate. The gauge ring permits a testing of the so-called "scanning measurement uncertainty" on those coordinating-measuring instruments which are equipped with a "measurement-probe head".

DETAILED DESCRIPTION

A preferred embodiment of the invention will be described in detail, in conjunction with the accompanying drawings, in which:

FIG. 1a is a side view of a test standard of the invention, as viewed from the aspect designated Ia–Ia in FIG. 1b;

FIG. 1b is a plan view of the test standard of FIG. 1a;

FIG. 3b is a plan view of the test standard of FIG. 3a; and

The test standard of FIGS. 1a and 1b has a rectangular support plate or body 1 having a central cutout 2, also of rectangular shape. The body plate 1 consists of material of low thermal expansion, such as, for example, Invar or Zerodur, so that the dimensions of the test standard remain substantially independent of ambient temperature.

Figure 2:
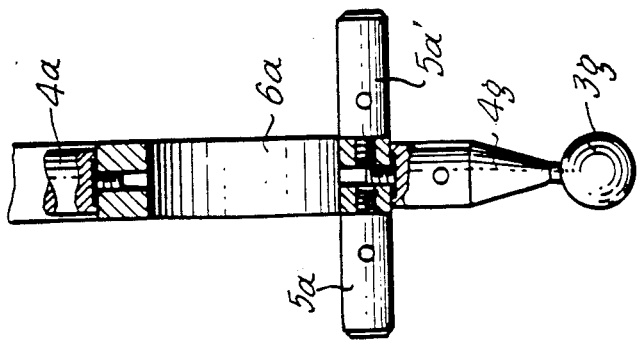
FIG. 2 is an enlarged fragmentary view of the test standard of FIG. 1, in the region of one of its balls with partial section taken in the plane II—II of FIG. 1b.

Extending from one side of the inner edge of the cutout 2, a first ball 3a is so secured to plate 1, by means of a conically tapered support 4a, that the center of ball 3a coincides with the center of symmetry of plate 1; in FIG. 2, the base end of support 4a is seen to be threadedly engaged to the flat surface of a side edge of cutout 2. The four corners of plate 1 are truncated by flats which mount diagonally directed support feet (4b, 4d, 4g and 4i) for similarly fixed positioning of four additional balls 3b, 3d, 3g and 3i; the centers of these balls define a rectangle. Four balls (3c, 3e, 3f and 3h), located on the bisectors of the four sides of this rectangle, are also and similarly mounted via obliquely outward protruding supports 4c, 4e, 4f and 4h, the sides of plate 1 being locally cut away, to provide a suitably inclined flat base for mounting each of the respective supports 4c, 4e, 4f, and 4h.

As is customary for test bodies, all of these balls (3a to i) consist of ceramic material, such as alumina, and are mounted with their centers in the plane of symmetry of plate 1, said plane being designated by S in FIG. 1a.

Four circular cutouts (6a to d) are provided in the four corners of plate 1 to reduce the weight of the plate. A precision gauge ring (6a') inserted in one of these cutouts (6a) permits use of a measuring-probe head on the coordinate-measuring instrument, in testing for so-called "scanning-measurement uncertainty" of the coordinate-measuring machine.

On one side of plate 1, three support feet (5a to c) are individually threaded to plate 1 (per FIG. 2), thus affording three-point support contact of the test standard when placed flat on the measurement table of a coordinate-measuring instrument.

Plate 1 has, in addition, another support foot 5b' aligned with the support foot 5b and extending from the which projects in the plane of ball centers, from one edge of the plate. By means of these additional supports (5b', 5e), the test standard can be set up, as indicated in FIGS. 1a and 1b, vertically on the table of a coordinate-measuring instrument. In this case, the support feet 5b and 5b' locate in V-shaped grooves in two columns 10a and 10b of a mounting stand 10.

Figure 3A:
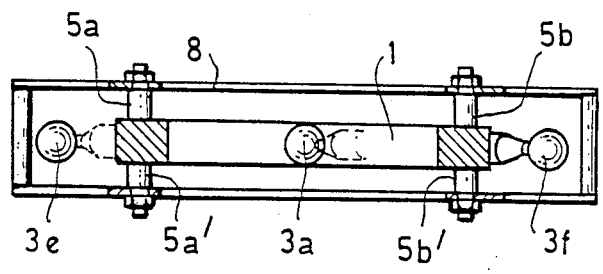
FIG. 3a is a section of a test standard as in FIG. 1, but additionally provided with protective cover means, the section being indicated at IIIa—IIIa in FIG. 3b.
Figure 3B:
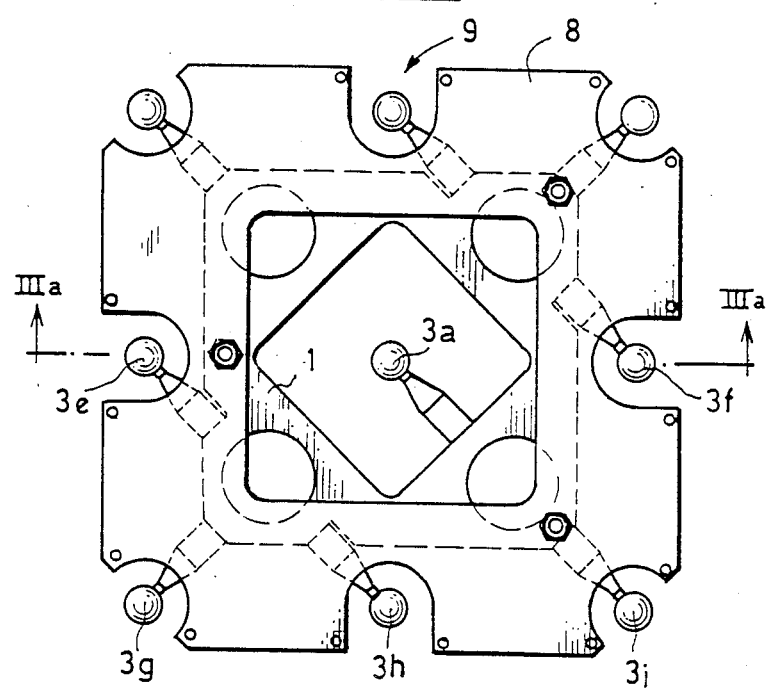

To protect balls 3 against impact, the test standard is provided with a protective cover 8 of sheet aluminum, as shown in FIGS. 3a and 3b. This protective cover can be secured to the mounting feet (5a to c) and consists of two plate halves lying opposite each other; these plate halves are stiffened by ribs which connect them together and which protrude beyond the outer periphery of plate 1, to such an extent that they protect the balls against impact. It will be understood that, as with support foot 5b' aligned with foot 5b, there are further feet 5a' and 5c' aligned with feet 5a and 5c and projecting (with foot 5b') from the opposite face of plate 1, so that the aluminum-sheet halves of the cover may be similarly mounted in the respective sides of plate 1.

In the region of the balls themselves, the cover-plate halves are provided with semicircular cutouts 9 so that the balls remain accessible for multiple-aspect contacting.

In order that the described standard can be used to determine measurement uncertainty of a coordinate-measuring instrument, the test standard must previously have been calibrated. This calibration process will be described with reference to FIG. 4.

First of all, the test standard is, for example, so oriented within the measurement volume of a coordinate-measuring instrument that its sides extend approximately parallel to measurement axes of the instrument. For this purpose, the test standard can be placed flat on the measurement table of the instrument, relying upon the three-point support afforded by feet (5a to c). It is not necessary that the coordinate-measuring instrument be an instrument which has already been tested for its precision of measurement. Rather, to calibrate the test standard, one can use a single coordinate-measuring instrument of unknown measurement uncertainty; and measurement uncertainty of the instrument can be determined after the test standard has been calibrated, in which case the thus-calibrated test standard can be used in a determination of measurement uncertainty of the instrument.

This is possible in view of the self-calibrating properties of the measurement method described below. For example, comparative measurements in which a test standard of the invention was calibrated first on a highly precise coordinate-measuring instrument, and then on a coordinate-measuring instrument which had a measurement uncertainty of more than 12 $\mu$m (and thus lay outside the specified tolerance), gave the same calibration data for the same test standard, within a spread of 1 $\mu$m.

Figure 4:
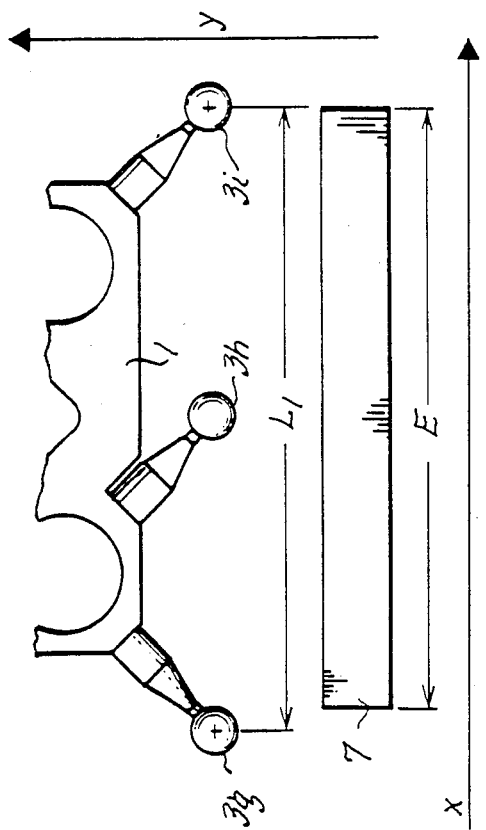
FIG. 4 is a diagram showing the test standard of FIG. 1 during a calibrating procedure, in conjunction with a gauge block within the measurement space of a coordinate-measuring instrument.

In FIG. 4, the test standard is so placed in a first orientation within the measurement volume of a coordinate-measuring instrument that the side alignment defined by balls 3g and 3i is approximately parallel to the x-measurement axis. A standardized gauge block designated 7, is also set up within the measurement volume of the instrument, aligned parallel to said axis (x).

In the position shown, the coordinates of the center-points of all nine balls (3a to 3i) of the test standard are now measured by the instrument.

The test standard is then rotated 90° about a normal to its surface, thus, for example, placing the test standard in a second orientation wherein the side line defined by balls 3b and 3g is approximately parallel to the x-measurement axis. The coordinates of all balls are then measured in this orientation. The computer of the coordinate measuring instrument, will be understood to have been loaded with the calibration program, so that the computer can then determine mean values of the spacings measured in both orientations, or mean values of the coordinates of the ball centers for measurements in both orientations.

In determining mean value, the computer does not use the measurement values obtained in the measurement-coordinate system of the measuring instrument; on the contrary, the measured values are transposed into the coordinate system of the test member. The coordinate transformation necessary for this can take place in three steps, as follows: First of all, a plane is determined which best fits the nine ball centerpoints. The position of rotation of the plane is then determined by a straight line, which may for example be one of the three straight lines best fitting the ball triplets 3b/3c/3d and 3e/3a/3f or 3g/3h/3i, or, better, the mean value of these three straight lines. The zero point of the coordinate system of the test standard is finally established by defining the same at the center of gravity of the centers of the nine balls of the test piece. All nine balls thus contribute in the same manner to definition of the reference coordinate system of the test standard.

As a result of having measured for all ball centers at each successively rotated orientation, distances ($L_A x$ and $L_A y$) measured and indicated for the x-measurement axis and for the y-measurement axis of the coordinate-measurement instrument are averaged to develop the mean value $L_A M$, i.e., $$L_A M = \frac{L_A x + L_A y}{2} \quad (1)$$

This mean value ($L_A M$) is inherently free of measuring-instrument errors of the two measurement axes (x and y); this mean value is also inherently free of such measuring-instrument errors as are attributable to deviation from orthogonality of the two measurement axes (x and y).

The length E of the gauge block 7 is then measured. For this purpose, the test standard can be removed from the measurement table of the coordinate-measuring instrument, and the gauge block 7 can be clamped at the former location and orientation of the balls (3g/3i) of the test standard. From the true (known and standardized) end-to-end gauge-block length (E) and the instrument-measured end-to-end gauge-block length ($E_A$), a correction factor $$K_1 = \frac{E}{E_A} \quad (2)$$

can be calculated.

One of the measured ball spacings, for example, the distance $L_1$ between the centers of balls 3g and 3i, is now compared with the length of the gauge block 7. In the event that the distance ($L_1$) and the length E of the gauge block are approximately the same, the correction factor ($K_1$) can also be used for the correction of the instrument-measured (indicated) length ($L_A$) For the true distance ($L_l$), we therefore have $$L_1 = K_1 \cdot L_A \quad (3)$$

A correction factor (K) can now be introduced whereby the indicated distance ($L_A M$), averaged over two positions 90° apart, must be multiplied in order to obtain the true mean value of the distance ($L_M$) between measured ball centers, i.e., $$LM = K \cdot L_A M \quad (4)$$

The true mean value (LM) of the ball spacing (3g/3i) must furthermore be identical to the true distance-measurement value ($L_1$), as corrected via the gauge-block measurement, which was determined in the first orientation parallel to the gauge block, i.e., $$LM = L_1 \quad (5)$$

From this condition (5) and the definition equation (4), it follows, in combination with equation (3), that $$K \cdot L_A M = K_1 \cdot L_A \quad (6)$$

and, by substituting for $K_1$ the value given by equation (2), it follows, for the correction factor (K), that $$K = \frac{L_A}{L_A M} \cdot \frac{E}{E_A} \quad (7)$$

The true or actual distances between any two of the nine balls of the test standard are thus derived by multiplying the mean values (LM) for each measured distance (obtained from the two orientations of the test standard), by the correction factor (K), this correction factor being determined by the comparative measurement of a longitudinal distance with the measured length of the gauge block 7, in accordance with equation (7).

After performing the indicated measurements and calculations, the test standard is calibrated and can be used for checking the measurement uncertainty either of the same or of a different coordinate-measuring instrument. In performing the method, it should also be pointed out that the sequence of measurement and calculating steps can be optimized for the shortest possible measurement time, by programming the computer so that at least some of the calculating steps, such as, for example, the calculation of mean values, occur during the time in which the gauge block is clamped and is being measured.

The calibration method described above, namely, involving use of a ball plate, is naturally also suitable for calibration of other flat test pieces, such as, for example, a perforated plate.

The actual determination of measurement uncertainty of a coordinate-measuring instrument by means of the calibrated test standard is then effected in known fashion, by a sequence of measurements wherein the test standard is placed in different orientations at different locations within the measurement volume of the instrument and wherein, for each orientation and/or location, measurements are made by contacting the involved nine balls. From any deviations of the indicated ball-center spacing measurements, with respect to the calibrated ball spacings of the test standard a determination can then be made not only for length-measurement uncertainty, but also for other measurement errors, such as, for example, deviations from the orthogonal relation of the measurement axes of the instrument. And by scanning a ring gauge (6a') that has been mounted to the test member, the scanning-measurement uncertainty can additionally be determined.

At this point, it should also be pointed out that the described test standard can be used not only to determine the measurement uncertainty of a coordinate-measuring instrument, but it is also suitable to determine the positional uncertainty of machine tools, for example, flexible set-up machine systems. Since many manufactures today already offer probe heads which can be chucked in place of a tool in a machine tool, a CNC-controlled checking of measurement uncertainty or positional uncertainty is applicable for machine tools, in a manner similar to that which has been described for coordinate-measuring instruments.

The required learning program for the ball-contacting processes of the machine tool can be effected via existing tool-feed and control instrumentalities of the machine tool. And an autarchic computer, for example, a suitably programmed personal computer, can be used for subsequent determination of the interrelationship of measurement results and for their evaluation.

What is claimed is:

1. A test standard for coordinate-measuring instruments and machine tools, comprising a flat plate which is constructed symmetrically on opposite sides of a central plane of symmetry at the mid-thickness of said plate, a plurality of balls fixedly mounted to said plate with all ball centers in said plane of symmetry, said balls being mounted with such clearance with respect to said plate as to provide ball-contacting measurement-probe access from each side of the said plane of symmetry.

2. The test standard of claim 1, in which said plate has plural outer-edge cutouts at spaced locations of its periphery, there being a single one of said balls mounted at each of said outer-edge cutouts.

3. The test standard of claim 1, in which a plurality of said balls are each mounted to said plate by a support body which projects the ball outwardly of the edge of said plate.

4. The test standard of claim 1, in which three spaced mounting feet on at least one side of said plate provide means for stabilized support of said plate against a flat support surface with said balls in spaced offset from the support surface.

5. The test standard of claim 1, in which a protective cover is carried by at least one side of said plate and in a plane at outward offset from intercept of said balls, there being cutouts in said cover to provide ball-contacting measurement access to said balls via the cutouts of said cover.

6. The test standard of claim 1, in which a gauge ring is mounted at a cutout in said plate, the axis of said gauge ring being normal to and extending symmetrically on opposite sides of said plane of symmetry.

7. The test standard of claim 4, in which the perimeter of said plate is rectangular and has a central cutout, and in which a support body secured to an edge portion of the central cutout positions the center of one of said balls at the center of symmetry of the rectangular perimeter of said plate.

* * * * *